(12) United States Patent
Clark et al.

(10) Patent No.: US 11,965,427 B1
(45) Date of Patent: Apr. 23, 2024

(54) GAS TURBINE ENGINE INCLUDING FLOW PATH FLEX SEAL AND HEAT SHIELD

(71) Applicant: Raytheon Technologies Corporation, Farmington, CT (US)

(72) Inventors: Thomas E. Clark, Wells, ME (US); Marc J. Muldoon, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/956,881

(22) Filed: Sep. 30, 2022

(51) Int. Cl.
*F01D 25/14* (2006.01)
*F01D 11/00* (2006.01)

(52) U.S. Cl.
CPC .......... *F01D 25/145* (2013.01); *F01D 11/005* (2013.01); *F05D 2240/15* (2013.01); *F05D 2260/231* (2013.01); *F05D 2260/232* (2013.01); *F05D 2260/30* (2013.01); *F05D 2260/60* (2013.01); *F05D 2300/175* (2013.01)

(58) Field of Classification Search
CPC ... F01D 11/005; F01D 25/145; F05D 2240/15
See application file for complete search history.

(56) References Cited

U.S. PATENT DOCUMENTS

| | | | | |
|---|---|---|---|---|
| 5,560,198 | A * | 10/1996 | Brewer | F02K 1/80 60/766 |
| 9,845,695 | B2 * | 12/2017 | Budnick | F01D 25/30 |
| 9,879,556 | B2 * | 1/2018 | Chuong | F01D 25/162 |
| 10,247,022 | B2 | 4/2019 | White et al. | |
| 10,247,106 | B2 | 4/2019 | Dansereau et al. | |
| 10,557,357 | B2 | 2/2020 | Kondo et al. | |
| 11,187,152 | B1 * | 11/2021 | Happ | F01D 9/023 |
| 11,473,464 | B2 * | 10/2022 | Gover | B01D 53/82 |
| 11,702,991 | B2 * | 7/2023 | Happ | F02C 7/24 415/177 |
| 2015/0315925 | A1 * | 11/2015 | Budnick | F01D 11/003 415/214.1 |
| 2015/0354386 | A1 * | 12/2015 | Chuong | F02C 7/28 415/182.1 |
| 2020/0072127 | A1 | 3/2020 | Blaney et al. | |
| 2021/0047953 | A1 * | 2/2021 | Gover | F02M 23/14 |
| 2022/0099030 | A1 * | 3/2022 | Happ | F01D 25/145 |

FOREIGN PATENT DOCUMENTS

| EP | 3211181 A1 | 8/2017 |
|---|---|---|
| EP | 3854995 A1 | 7/2021 |

OTHER PUBLICATIONS

European Search Report for EP Application No. 23201006.6 dated Mar. 4, 2024.

* cited by examiner

*Primary Examiner* — Eldon T Brockman
(74) *Attorney, Agent, or Firm* — Carlson, Gaskey & Olds, P.C.

(57) ABSTRACT

A gas turbine engine includes a primary flow path fluidly connecting a compressor section, a combustor section and a turbine section. A cooling air flowpath is disposed radially outward of the primary flowpath. A first seal spans from an inner diameter of the cooling air flowpath to an outer diameter of the cooling air flowpath. The first seal includes at least one axial convolution and a plurality of pass through features defining a purge airflow. A heat shield is positioned immediately downstream of the first seal and is configured in relation to the first seal such that the purge airflow enters a mixing plenum defined between the heat shield and the first seal.

20 Claims, 4 Drawing Sheets

GAS TURBINE ENGINE INCLUDING FLOW PATH FLEX SEAL AND HEAT SHIELD

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Gas generator engines utilize a series of rotating airfoils alternating with static airfoils to compress and expand flowpath air. The rotating stages are supported by a static frame and shaft bearing system. At the interfaces between static frames and flowpath fairings adjacent to rotating stages it is desired to limit windage due to recirculating air and also to seal component cooling air from the hot flowpath air.

Turbine engine manufacturers continuously seek improvements to engine performance including improvements to thermal, transfer and propulsive efficiencies.

SUMMARY

In one exemplary embodiment a gas turbine engine includes a primary flow path fluidly connecting a compressor section, a combustor section and a turbine section, a cooling air flowpath radially outward of the primary flowpath, a first seal spanning from an inner diameter of the cooling air flowpath to an outer diameter of the cooling air flowpath, the first seal including at least one axial convolution and a plurality of pass through features defining a purge airflow, and a heat shield immediately downstream of the first seal, the heat shield being configured in relation to the first seal such that the purge airflow enters a mixing plenum defined between the heat shield and the first seal.

In another example of the above described gas turbine engine the first seal and the heat shield are mechanically fastened to the outer diameter of the cooling air flowpath.

In another example of any of the above described gas turbine engines the first seal and the heat shield are mechanically fastened to the outer diameter of the cooling air flowpath via a single mechanical fastener protruding through both the first seal and the heat shield.

In another example of any of the above described gas turbine engines the single mechanical fastener extends through a flange protruding radially inward from the inner diameter of the cooling air flowpath.

In another example of any of the above described gas turbine engines the first seal is mechanically coupled to the inner diameter of the cooling air flowpath.

Another example of any of the above described gas turbine engines further includes a gap defined between a radially inward end of the heat shield.

In another example of any of the above described gas turbine engines the first seal is a segment of approximately identical seals configured in an annular arrangement.

In another example of any of the above described gas turbine engines the heat shield is a segment of approximately identical heat shields configured in an annular arrangement.

In another example of any of the above described gas turbine engines each of the first seal and the heat shield are non-segmented annular components.

In another example of any of the above described gas turbine engines the first seal includes from one to five axial convolutions.

In another example of any of the above described gas turbine engines the first seal includes exactly two axial convolutions.

In another example of any of the above described gas turbine engines the first seal is constructed of a first nickel-chromium based superalloy, and the heat shield is constructed of a second nickel-chromium based superalloy distinct from the first nickel-chromium based superalloy.

In another example of any of the above described gas turbine engines the first seal is constructed of INCO 718 and the heat shield is constructed of INCO 625.

In another example of any of the above described gas turbine engines the first seal is a rigidly attached flex seal.

An exemplary method for protecting a seal within a hot section of a gas turbine engine includes disposing a flex seal within a cooling air flowpath, the flex seal including a plurality of pass through holes configured to generate a purge airflow and the flex seal being connected to a radially inner wall of the cooling air flowpath and a radially outer wall of the cooling air flowpath; disposing a heat shield downstream of the flex seal such that a purge air plenum is defined between the flex seal and the heat shield, and passing an airflow through the flex seal into the purge air plenum, and around the heat shield.

In another example of the above described method for protecting a seal within a hot section of a gas turbine engine air passed through the flex seal is passed at a higher pressure than a primary flowpath radially inward of the cooling airflow path, thereby preventing backflow from the primary flowpath into the purge air plenum.

In another example of any of the above described methods for protecting a seal within a hot section of a gas turbine engine the flex seal flexes at at least one axial convolutions.

In another example of any of the above described methods for protecting a seal within a hot section of a gas turbine engine the flex seal includes from one to five axial convolutions.

In another example of any of the above described methods for protecting a seal within a hot section of a gas turbine engine the first seal is a segment of approximately identical seals configured in an annular arrangement and the heat shield is a segment of approximately identical heat shields configured in an annular arrangement.

In another example of any of the above described methods for protecting a seal within a hot section of a gas turbine engine the first seal is a non-segmented annular component and wherein the heat shield is a non-segmented annular component.

These and other features disclosed herein can be best understood from the following specification and drawings, the following of which is a brief description.

DETAILED DESCRIPTION

Figure 1:
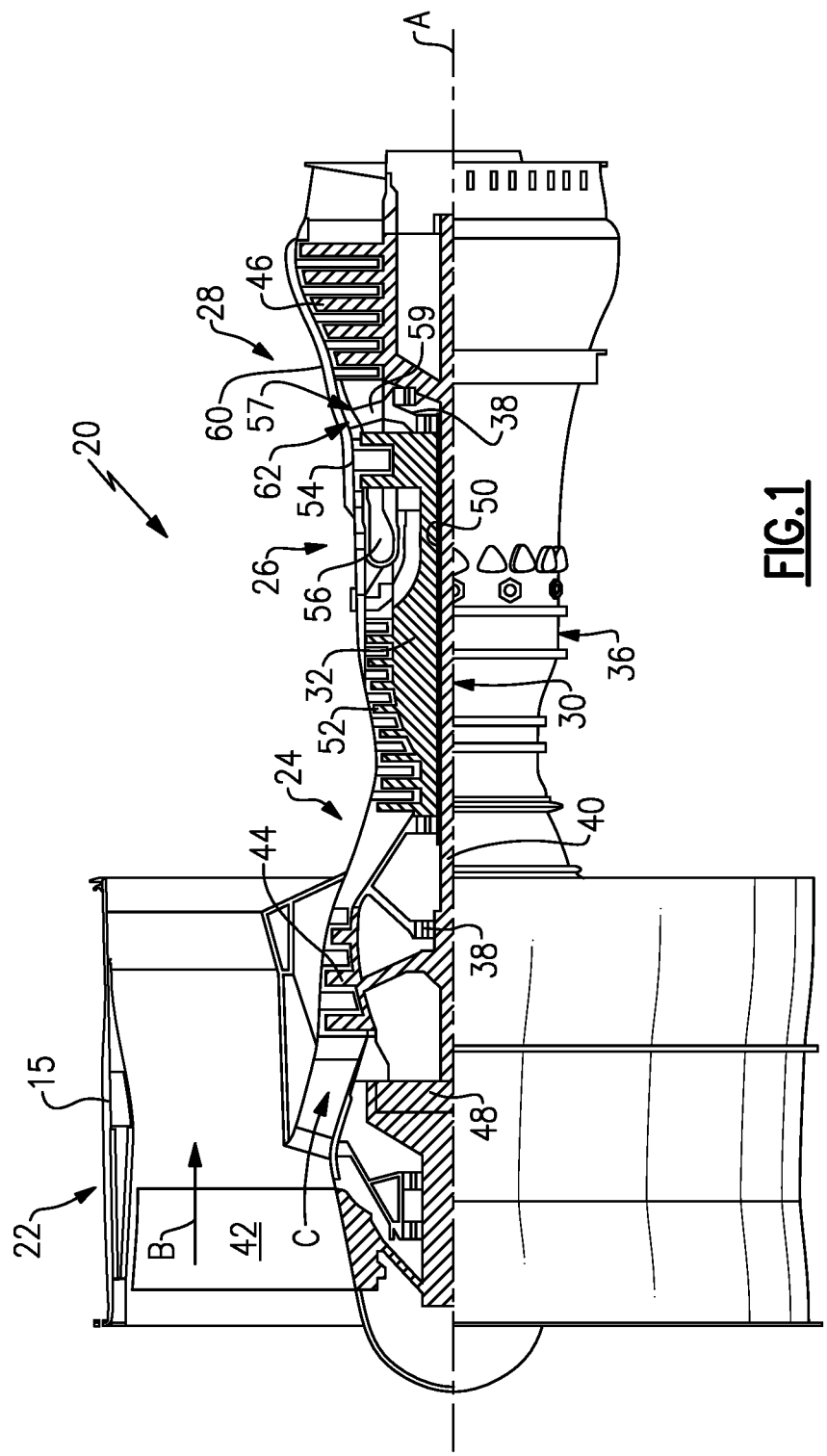
FIG. 1 is a schematic view of an example gas turbine engine including an flow path flex seal with cooling air bifurcation.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } °\text{ R})/(518.7° \text{ R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Furthermore, in the hot section of the engine, there may be significant thermal growth between the flowpath fairings and relatively cooler frame structure. In the hot section, the flowpath temperatures are often above the operating temperature of most structural materials. This makes the task of effectively sealing such interfaces challenging. Prior art solutions have used sliding piston seals, rigidly-attached flex (aka bellows) seals, or a combination of both. Piston seals can suffer from high wear rates, especially in hot environments that are near material limits.

In order for rigidly attached flex seals to accommodate large deflections they must be designed to operate at stress levels within material capability. This can be difficult to accommodate in areas with limited packaging space in hot operating environments due to the combination of a relatively stiff seal design coupled with high temperatures that reduce material temperature capability.

In the example engine 20 of FIG. 1, a turbine cooling air flowpath 60 is positioned radially outward of the primary flowpath, and radially inward of an engine casing. The turbine cooling air flowpath 60 includes a flex seal configuration 62 that is configured to provide sufficient stress capabilities while operating in a hot section of the engine. The flex seal configuration 62 includes an axially convoluting flex seal and a heat shield downstream of the flex seal.

Due to the packaging space constraints of the gas turbine engine 20 coupled with high thermal deflections, the stress level in the flex seal 62 will be relatively high, so a material with a high fatigue limit, such as INCO 718, is desirable. Due to the high temperature environment, a material with a high max use temperature, such as INCO 625, is desired. These requirements are in conflict because materials with high LCF limits do not offer the required max use temperature, and vice versa. The combination flex seal and heat shield configuration described herein rectifies this apparent conflict.

Figure 2:
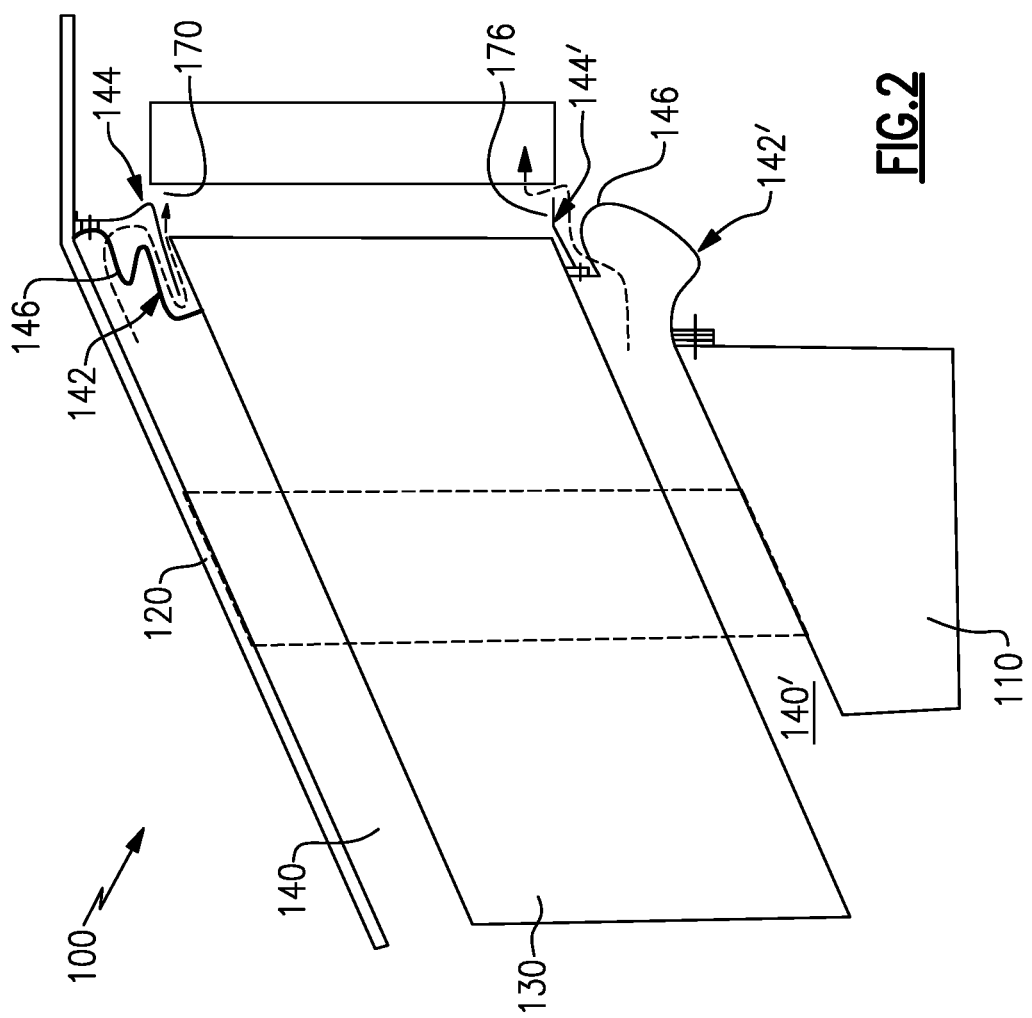
FIG. 2 is a schematic view of a portion of a gas turbine engine including flow path flex seal and heat shield configurations.

With continued reference to FIG. 1, FIG. 2 schematically illustrates an exemplary hot section 100 including a bearing support 110 supporting an engine casing 120. Between the engine casing 120 and the bearing support 110 is the primary flowpath 130. Radially outward of the primary flowpath 130 and the engine casing 120 is a cooling air flowpath 140. A combined flex seal 142/heat shield 144 provides the stress relief of a high fatigue limit material through the flex seal 142 and provides a high max use temperature through the heat shield 144.

The flex seal 142 includes multiple axial convolutions 146 and the axial convolutions absorb high deflections. As used herein, a convolution refers to a change in axial direction of the component. The illustrated radially outward flex seal 142 of FIG. 2 includes two axial convolutions and the radially inward flex seal 142' includes one axial convolution. In some examples, the flex seals 142, 142' include from two to five convolutions, with the specific number of convolutions being determined based on the stress relief required from the flex seal 142, 142', and the packaging constraints of the position that the flex seal 142 occupies within the engine.

In order to achieve the flexibility, the flex seal 142 is constructed of a high low cycle fatigue limit (LCF limit) material (in one example, INCO 718). The flex seal 142 extends the full span of the cooling air flowpath 140 from the inner circumference of the engine casing 120 to the outer circumference of the structure defining the primary flowpath 130. In order to prevent the heat from the hot section impacting the performance or integrity of the lower max temperature flex seal 142, the heat shield 144 extends radially inward from the inner circumference of the engine casing 120 toward the outer diameter of the structure defining the primary flowpath 130 without contacting the structure. In this way, a gap is defined between the radially inner end of the heat shield 144 and the edge of the primary flowpath 130. In addition to extending radially inward, the radially outer heat shield 144 includes an axial extension that partially blocks a primary flowpath gap 170 and creates a convoluted flow through the flex seal 142 and heat shield 144. The convoluted flow further isolates the flex seal 142 from the hot gasses in the primary flowpath 130.

A second flex seal 142' and heat shield 144' configuration is positioned radially inward of the flowpath 130 and serves a similar function.

During operation, cooling air in the cooling air flowpath 140, 140' is flowed through holes in the flex seal 142, 142' at a higher pressure than the expanding gasses in the flowpath 130. The airflow through the flex seals 142, 142' is referred to as a purge air flow. The higher pressure, combined with the convoluting air flow route defined by the combination of the flex seal 142, 142' and the heat shield 144,144' ensures that there is no back leakage of combustion gasses from the primary flowpath 130 onto the flex seal 142, 142' and the flex seal 142, 142' is able to be constructed of the lower max temperature materials.

Figure 3:
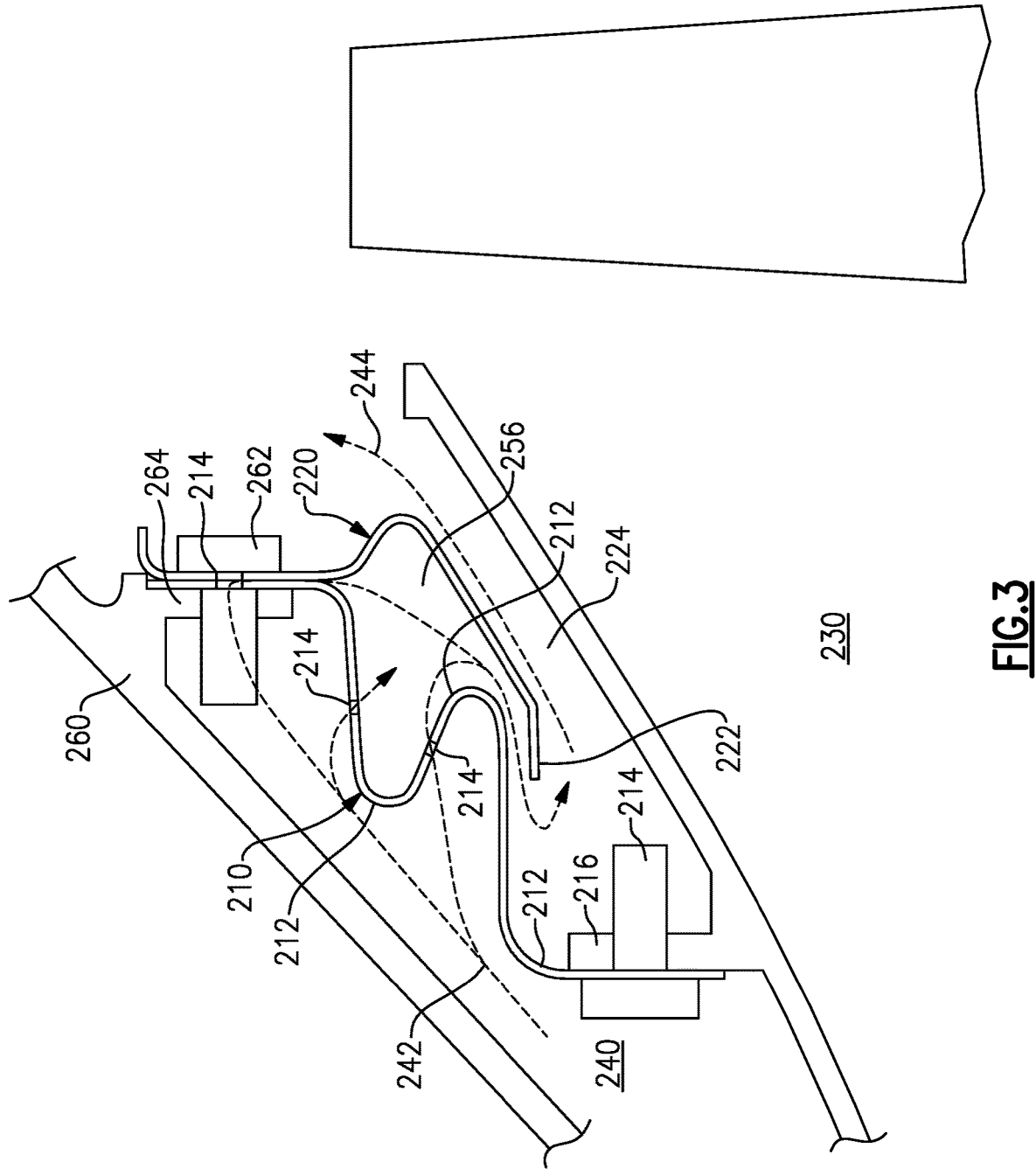
FIG. 3 is a schematic view of an example flex seal and heat shield configuration within a turbine cooling air flow.
Figure 4:
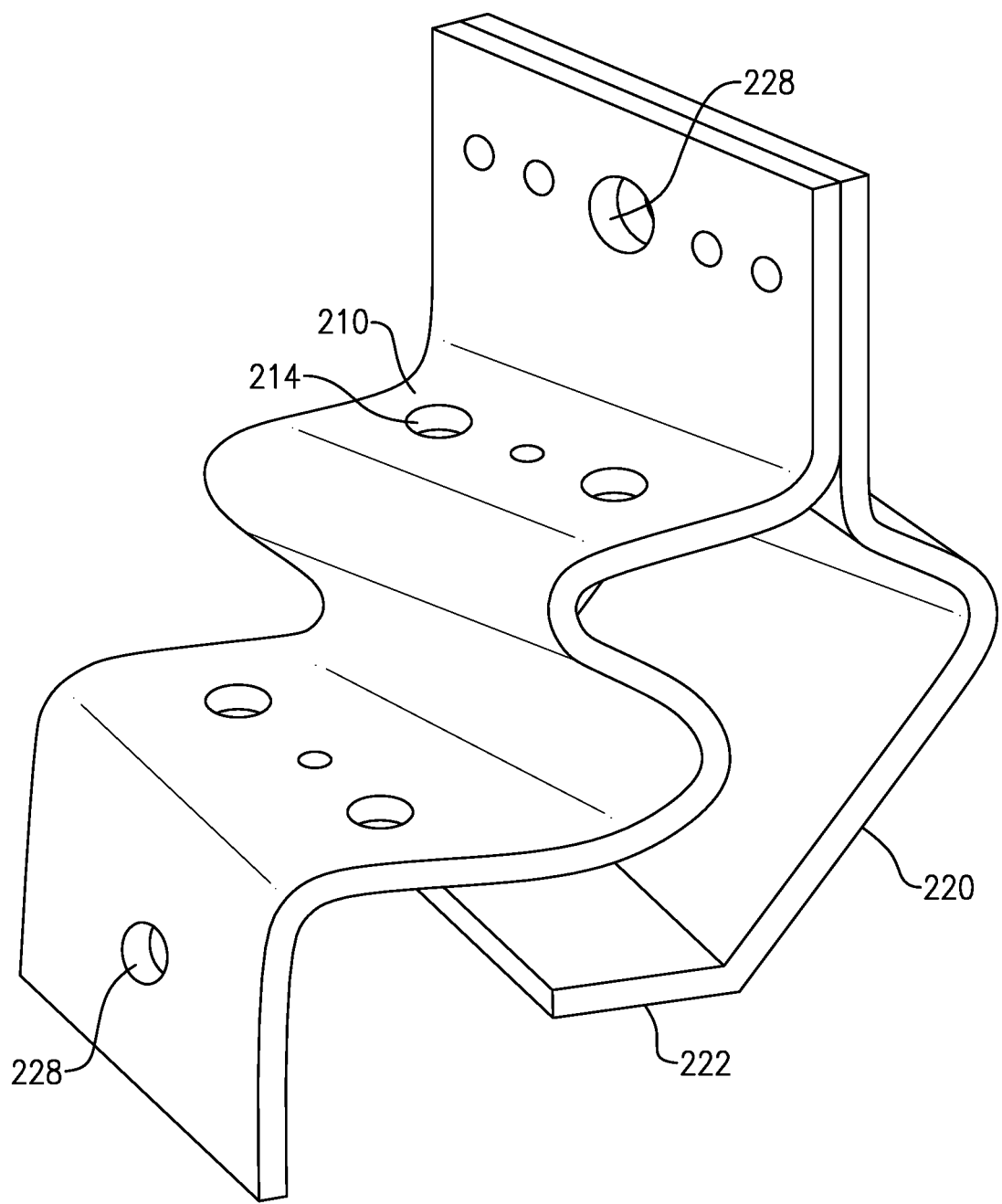
FIG. 4 isometrically illustrates a schematic view of an example flex seal and heat shield configuration.

With continued reference to FIGS. 1 and 2, FIG. 3 schematically illustrates an exemplary flex seal 210/heat shield 220 configuration suitable for use radially outward of the primary flowpath 230 and FIG. 4 schematically illustrates an isometric view of the same flex seal 210/heat shield 220 configuration removed from the context of the engine The flex seal 210 includes two axial convolutions 212, and multiple through holes 214, through which purge air 242 in the cooling air flowpath 240 can flow. The combination of the flex seal 210 and the heat shield 220 defines a mixing plenum 250 that mixes the multiple flows from the through holes 214 to provide a single joined purge air flow 244. As described above, the purge airflow 244 is at a higher pressure than the flow in the primary flowpath 230, and prevents backflow.

Both the flex seal 210 and the heat shield 220 are fastened to the engine casing 260 via a fastener 262 that protrudes through each of the heat shied 220 and the flex seal 210, as well as a corresponding flange 264 extending radially inward from the engine casing 260. Attentive examples may fasten the heat shield 220 and the flex seal 210 to the radially outward engine casing 260 using alternative fastener types to similar effect.

The heat shield 220 protrudes radially inward to an axially extending end 222, with a gap 224 radially inward of the heat shield within the cooling air flowpath 240. The radially inward end 212 of the flex seal 210 is fastened to the inner diameter of the cooling air flowpath via a fastener 214 that extends through the flex seal 210 and a flange 216 protruding radially outwardly from the inner diameter of the cooling air flowpath 240.

Each of the fasteners protrudes through corresponding through holes 228 in the flex seal 210 and heat shield 220.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
 a primary flow path fluidly connecting a compressor section, a combustor section and a turbine section;
 a cooling air flowpath radially outward of the primary flowpath;
 a first seal spanning from an inner diameter of the cooling air flowpath to an outer diameter of the cooling air flowpath, the first seal including at least one axial convolution and a plurality of pass through features defining a purge airflow; and
 a heat shield immediately downstream of the first seal, the heat shield being configured in relation to the first seal such that the purge airflow enters a mixing plenum defined between the heat shield and the first seal.

2. The gas turbine engine of claim 1, wherein the first seal and the heat shield are mechanically fastened to the outer diameter of the cooling air flowpath.

3. The gas turbine engine of claim 2, wherein the first seal and the heat shield are mechanically fastened to the outer diameter of the cooling air flowpath via a single mechanical fastener protruding through both the first seal and the heat shield.

4. The gas turbine engine of claim 3, wherein the single mechanical fastener extends through a flange protruding radially inward from the inner diameter of the cooling air flowpath.

5. The gas turbine engine of claim 1, wherein the first seal is mechanically coupled to the inner diameter of the cooling air flowpath.

6. The gas turbine engine of claim 1, further comprising a gap defined between a radially inward end of the heat shield.

7. The gas turbine engine of claim 1, wherein the first seal is a segment of approximately identical seals configured in an annular arrangement.

8. The gas turbine engine of claim 7, wherein the heat shield is a segment of approximately identical heat shields configured in an annular arrangement.

9. The gas turbine engine of claim 1, wherein each of the first seal and the heat shield are non-segmented annular components.

10. The gas turbine engine of claim 1, wherein the first seal includes from one to five axial convolutions.

11. The gas turbine engine of claim 10, wherein the first seal includes exactly two axial convolutions.

12. The gas turbine engine of claim 1, wherein the first seal is constructed of a first nickel-chromium based superalloy, and the heat shield is constructed of a second nickel-chromium based superalloy distinct from the first nickel-chromium based superalloy.

13. The gas turbine engine of claim 12, wherein the first seal is constructed of INCO 718 and the heat shield is constructed of INCO 625.

14. The gas turbine engine of claim 1, wherein the first seal is a rigidly attached flex seal.

15. A method for protecting a seal within a hot section of a gas turbine engine comprising:
 disposing a flex seal within a cooling air flowpath, the flex seal including a plurality of pass through holes configured to generate a purge airflow and the flex seal being connected to a radially inner wall of the cooling air flowpath and a radially outer wall of the cooling air flowpath;
 disposing a heat shield downstream of the flex seal such that a purge air plenum is defined between the flex seal and the heat shield; and
 passing an airflow through the flex seal into the purge air plenum, and around the heat shield.

16. The method of claim 15, wherein air passed through the flex seal is passed at a higher pressure than a primary flowpath radially inward of the cooling airflow path, thereby preventing backflow from the primary flowpath into the purge air plenum.

17. The method of claim 15 wherein the flex seal flexes at at least one axial convolutions.

18. The method of claim 17, wherein the flex seal includes from one to five axial convolutions.

19. The method of claim 15, wherein the first seal is a segment of approximately identical seals configured in an annular arrangement and the heat shield is a segment of approximately identical heat shields configured in an annular arrangement.

20. The method of claim 15, wherein the first seal is a non-segmented annular component and wherein the heat shield is a non-segmented annular component.

* * * * *